United States Patent Office 3,468,654
Patented Sept. 23, 1969

3,468,654
METHOD AND APPARATUS FOR CONTROLLING THE HEAT BUILD-UP WITHIN GLASSWARE FORMING APPARATUS
Julius J. Torok, Toledo, Ohio, assignor to Owens-Illinois, Inc., a corporation of Ohio
Filed May 2, 1966, Ser. No. 554,924
Int. Cl. C03b *11/12;* F28f *27/00*
U.S. Cl. 65—162                    6 Claims

ABSTRACT OF THE DISCLOSURE

This invention relates to the method and apparatus for controlling the heat build-up within a mold or plunger of a glass molding machine. The improvement in the apparatus consists of placing openings in the internal section of the plunger to direct cooling fluid in a rotational direction against the interior of the external section of the plunger; the new method of controlling the heat build-up in the plunger utilizes the transition characteristics between film boiling and nucleate boiling of the cooling fluid. When the exterior of the plunger approaches the upper limit of its desirable temperature range, the cavity between the internal and external portion of the plunger is purged with a limited amount of cooling fluid, thus increasing the heat transfer between the exterior of plunger and the cooling fluid.

---

Figure 1:
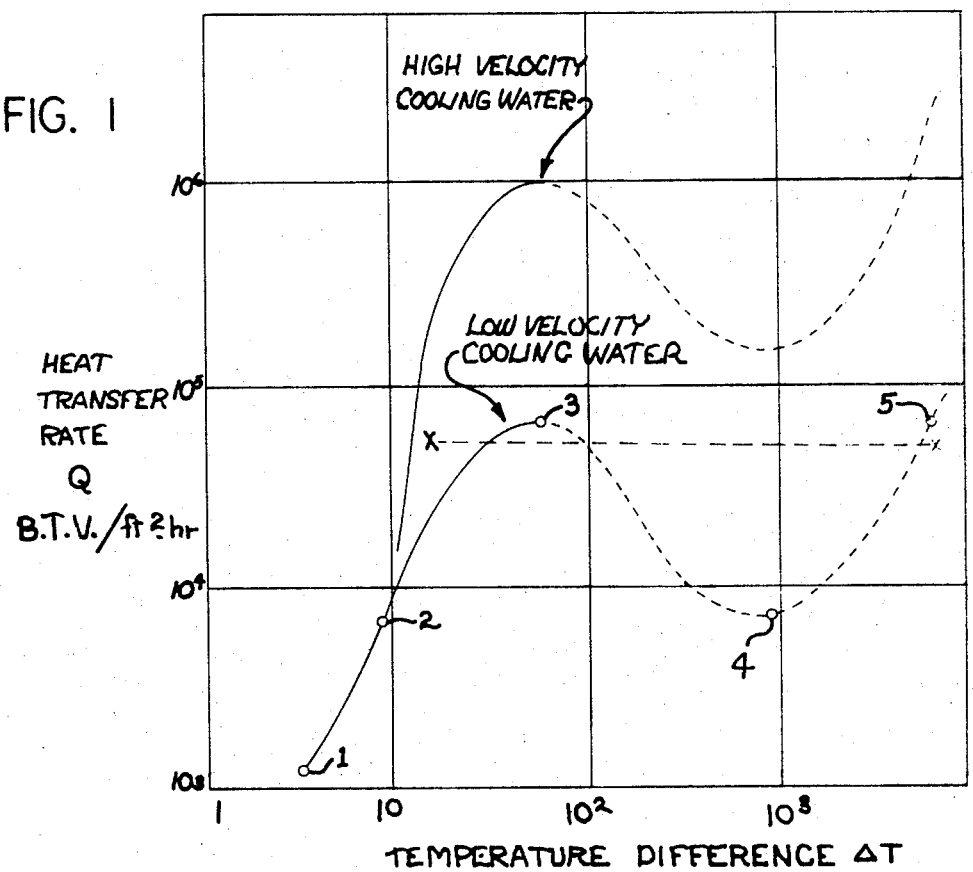

This invention relates to the apparatus useful in the manufacture of glass articles such as jars, bottles and other containers and also to the method of maintaining the desired temperature within said apparatus. More particularly, the present invention relates to a method and apparatus wherein the heat build-up within the mold or plunger is controlled by the utilization of the transition characteristics between film boiling and nucleate boiling.

Glass articles, as for example bottles, are customarily formed by placing a charge of hot molten glass into a parison forming cavity, then introducing a plunger into the charge of glass so as to produce a hollow parison that can subsequently be formed to the final desired configuration with the aid of a blow mold or other glass shaping apparatus. In addition to the formation of glass articles by utilizing a blow mold, objects such as ashtrays are formed to their final configuration by the direct action of a plunger and other mold parts.

The repeated exposure of the plunger as it comes into contact with the molten glass during the forming operation causes its temperature to rise, therefore, it is imperative that it be cooled to within an acceptable working range. If the plunger is not cooled it will reach a temperature at which the glass will begin to fuse to the metal exterior of the plunger. Such adherence of the glass to the exterior of the plunger will necessitate a stoppage of the forming equipment in order to repair the damage caused by the fusing of the glass of the plunger. If the temperature of the plunger is not maintained, or permitted to fall below a predetermined level, wrinkles or other imperfections can result in the finished article. Therefore, it is evident that there exists a desirable working range within which the plunger should be maintained.

As herein illustrated and described the invention provides a method and apparatus for utilizing the transition characteristics between nucleate and film boiling conditions of the fluid used to control and keep the plunger temperature within the range best suited for the formation of glass articles.

Nucleate boiling is the ordinary boiling of a fluid such as water. Small gaseous bubbles form on the inside surface of the container for the liquid. The bubbles then disengage themselves and are carried to the top of the liquid. In this manner a practically continuous layer of liquid is always in contact with the surface of the container. Nucleate boiling is a constant temperature phenomenon since the heat introduced into the fluid can be dissipated by the constant forming and reforming of bubbles.

Film boiling differs from nucleate boiling in that the heat input into a container of fluid is so great that all of the small gaseous bubbles that form on the interior of the fluid container cannot escape from the surface therefore they unite to form a continuous gaseous interlayer between the fluid and the container. When this occurs the quantity of heat carried off by the water drops markedly and the temperature of the container will start to rise rapidy.

The apparatus used to describe the present invention employs a plunger containing an inner section and an outer section. The inner and outer sections are spaced apart so as to define a cavity therebetween. The cooling fluid in the cavity between the inner and outer sections is permitted to reach a heat transfer rate high enough so that film boiling will result thus blocking a rapid flow of heat from the outer section to the cooling fluid and the inner section. When the fluid within the cavity between the inner and outer sections is permitted to attain a state of film boiling, there is a rapid buildup of heat in the exterior portion of the plunger. The wall of the outer section can quickly rise in temperature, for example, to 600–800° F. The rise in temperature is monitored by means of a temperature controller which in turn is coupled to a valve which controls the flow of the cooling fluid to the cavity between the inner and outer sections of the plunger. A desired temperature range is maintained through the action of a temperature controller that can sense the actual temperature of the plunger and relay a signal to the cooling fluid line. When the plunger exterior is approaching the upper limit of its desirable temperature range, the cavity is purged with a limited amount of cooling fluid thus destroying the state of film boiling and substituting therefore a nucleate boiling state with its inherently large capacity for the transfer of heat. Thus the excess heat from the exterior portion of the plunger can flow inward and ultimately be carried away by the cooling fluid circulating through the cavity.

One of the primary objects of this invention is to provide an apparatus for forming articles from molten material, wherein said apparatus is capable of being maintained within a prescribed temperature range.

An additional object of the present invention is to provide a method for controlling the flow of heat during the forming of articles made from a molten material.

A further object of this invention is to provide a method of utilizing the transition characteristics between nucleate and film boiling state of a fluid to act as a heat flow valve.

Another object of the present invention is to provide a relatively high temperautre fluid cooled plunger useful in the formation of articles from a molten material.

Figure 3:
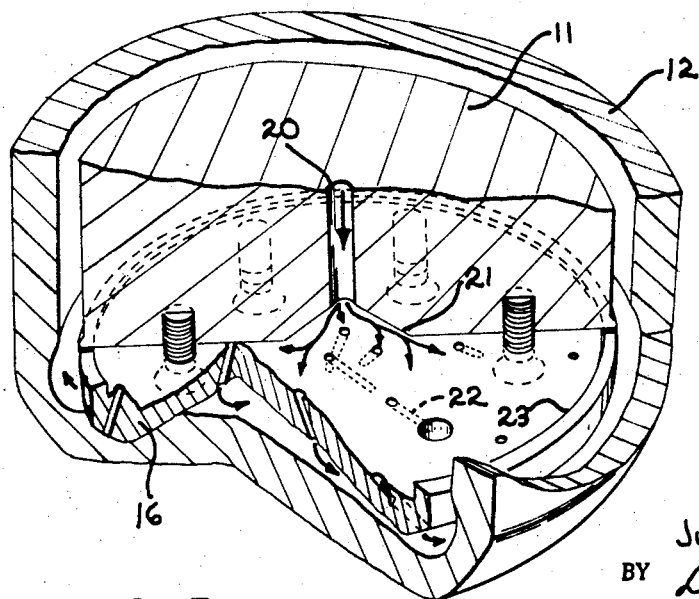
Figure 2:
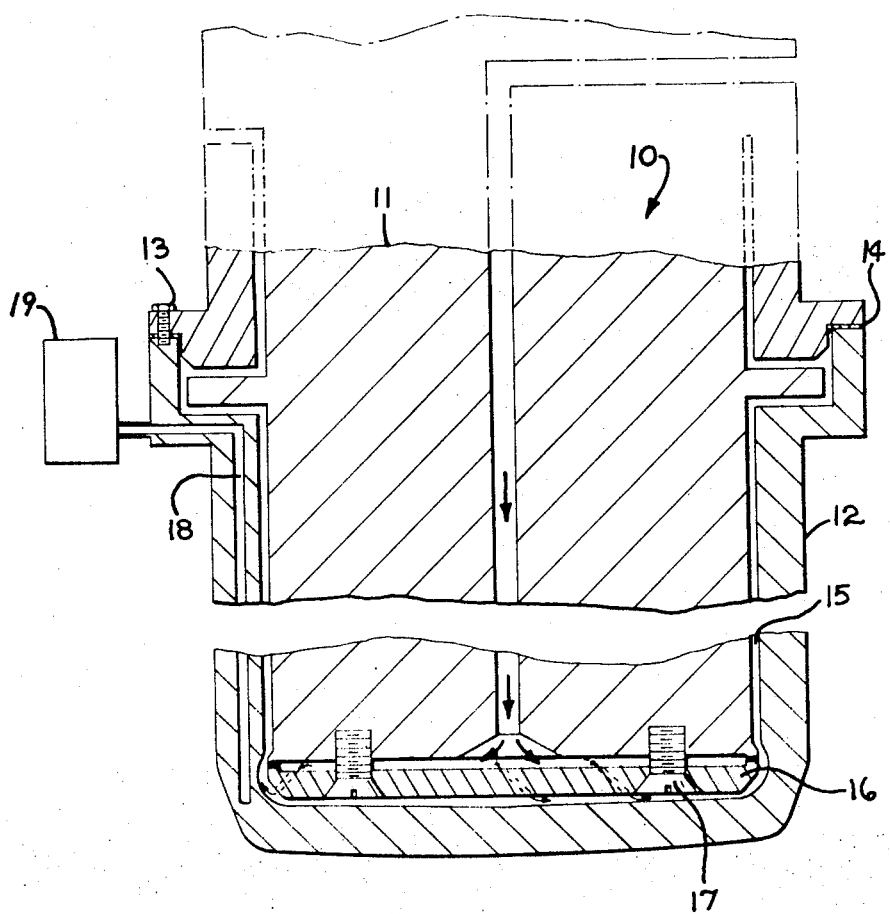

Other objects and advantages of the invention will hereinafter be pointed out or will be obvious from the following description and the accompanying drawings in which:

FIG. 1 is a graph depicting the heat flow rates of a slow moving cooling fluid and a high velocity cooling fluid, FIG. 2 is a cross-sectional view of a typical plunger employing features of the present invention, and FIG. 3 is a perspective view of the bottom portion of the plunger showing the fluid cavity and the direction of flow therein.

As has been stated before, normal boiling of water or nucleate boiling takes place at a temperature in the range of 212° F., or a few degrees above at ambient pressure.

This temperature, however, is much too low to be conveniently used as a mold or plunger coolant for glass forming. In the ordinary forming of glass articles by means of a press, employing a plunger, the temperature must be maintained above 630° F., or else the glass will start to crizzle or wrinkle. Such wrinkles not only produce a localized weak area but also detract from the appearance of the finished product. Fluids such as water can be utilized to cool plungers in glass article making apparatus only because of the high temperature drop in the metal walls of the outer section of the plunger.

In practice the high thermal conductivity of the outer section of the plunger permits the glass contacting surface of the plunger to be in the range of 700° F. to 800° F. while the water cooled surface of the interior of the plunger is in the range of 212° F. to 230° F. The high temperature drop associated with the plunger wall somewhat fixes the plunger design and the speed at which it can operate under normal conditions.

A study of boiling reveals that a change in temperature drop occurs when the heat flux reaches values in the range of 70,000 to 100,000 B.t.u./ft.$^2$ hr. This point is sometimes referred to as the burn-out point or the range where film boiling replaces nucleate boiling. When this transitional range is attained the temperature difference between the interior wall of the metallic plunger and the bulk water rises suddenly and the quantity of heat carried off by the water drops markedly. When the heat transfer rate drops because of film boiling the mold temperature will quickly rise in temperature above the 1000° F. range. In the formation of glass articles a "hot bite" would occur. At this temperature the glass actually fuses to the metal.

A water cooled plunger can be raised to the 500–1000° F. range by reducing the water cooled area so much that it exceeds the range of 70,000 to 100,000 B.t.u./ft.$^2$ hr. The system will then go into film boiling and the temperature will rise above the 1000–1200° F. range. If the water flow is increased, the temperature will begin to fall. The water flow can be increased or decreased as required to progressively move the system from a state of nucleate boiling to film boiling. A temperature controller of known type can be employed to sense the heat within the plunger and regulate the flow of cooling fluid to the mold cavity either continuously or intermittently.

FIG. 1 is a log-log graph showing along the abscissa the temperature difference $\Delta T$ between the metal of the outer section and the cooling fluid within the cavity. For the purpose of illustrating the invention the cooling fluid will be considered as water. FIG. 1 represents only the boiling state of water since the heat required to bring the water from the ambient state up to boiling has not been shown. The units as shown along the ordinate are expressed as $q/A$ or Q the heat transfer rate in B.t.u./ft.$^2$ hr. In the region between points 1 and 2 on the low velocity cooling water curve the fluid within the cavity is at a low level of nucleate boiling and heat is removed from the interior surface of the outer section by the ordinary convection of the fluid or water. As a temperature rise occurs, such as between points 2 and 3 nucleate boiling begins to occur more rapidly thus transferring heat away from the inner surface of the outer section by conduction as well as convection. With the input of additional heat, the curve will pass through a maximum point such as 3, then progress through the Leidenfrost point 4 which is the minimum heat transfer point of this particular portion of the curve. Additional heat input will cause the curve to once more progress in a positive direction and as the curve reaches point 5, the film boiling which began over the range of points 3 and 4 has blocked most of the ordinary convective heat transfer. The heat transfer through the cooling media, which by now is in the gaseous state is a combination of thermal radiation and conduction.

Thus it is readily apparent that as the outer section of the plunger is subjected to more and more heat, the heat transfer rate Q will progress upwardly until it reaches the vicinity of line X—X. A slight increase in heat input will cause a rapid shift through points 3, 4, and 5. The Q value in the above example has remained essentially constant whereas $\Delta T$ has undergone a very significant increase. This sudden shift in $\Delta T$ results in a very rapid rise in the temperature of the outer section of the plunger.

By keeping the velocity of the cooling water low, the value of Q can be kept in the range of 70,000 to 100,000 B.t.u./ft.$^2$ hr. thus forcing the system into a state of film boiling and a rise in plunger temperature for the same heat flow rate. If the above set forth process is not stopped the mold temperature would rise above 1000° F. thus causing the glass to fuse to the metal. The increase in temperature can be controlled by sensing the high degree of heat in the outer section of the plunger with a temperature controller which in turn can regulate the flow of cooling water. As shown in FIG. 1, by way of comparison, the high velocity cooling water curve shows that approximately ten times more heat can be carried away by merely regulating the flow of the cooling medium. In this manner, the system can be brought into and out of the condition of film boiling at will. The high velocity cooling water permits the injection of a small quantity of cooling fluid into the cavity within the plunger to destroy the film boiling state for short periods of time thus permitting the plunger temperature to be regulated in an operable range that is well above the temperature of nucleate boiling.

Referring now to FIG. 2 of the drawings where a cross-sectional view of a typical plunger is shown, the overall plunger is represented by the numeral 10. The plunger 10 is fabricated from two sections, an inner section 11 and an outer section 12. Outer section 12 has an external contour that conforms to the internal geometry of the glass article that is produced. The glass article and the exterior mold that forms the outside surface of the glass article have not been shown since they are not considered part of this invention. Outer section 12 can be made from a variety of metals and metal combinations such as bronze or such materials that have excellent heat transfer properties without resulting in a plunger of excessive weight. Such materials which have come into common use for manufacturing molded glass articles have the advantage that they are resistant to physical and chemical action with the glass. A sample of such a material employed in the making of plungers is an aluminum bronze alloy comprising substantially the following composition: copper 67%, nickel 17%, aluminum 7.2%, zinc 8.42%, iron 0.37% and manganese 0.01%. Exterior section 12 of plunger 10 is attached to inner section 11 by fasteners such as bolts 13. A heat insulating gasket 14 helps to stop the heat flow from the hot exterior section 12 to the rest of the plunger assembly. A void or cavity 15 is shown between inner section 11 and outer section 12 thus providing a chamber for the passage of a cooling fluid. At the bottom of the inner section 11 is a fluid dispensing plate 16 which is removably attached to section 11 by fasteners 17. In order to monitor the temperature in outer section 16, a thermocouple well 18 is positioned within the wall structure thereof. A thermal indicator is then placed within well 18 and connected to a temperature controller 19 which is shown in block form in FIG. 2. Any of the well-known heat sensing devices may be employed within well 18 and the controller, which receives and utilizes the signal produced by the heat sensing device to regulate the flow of the cooling fluid can likewise be of conventional design, therefore these items need not be discussed herein.

FIG. 3 is a perspective view shown partly in section of the lower section of the plunger. The cooling fluid is brought to the lower part of plunger 10 through channel 20. The direction of flow of the cooling fluid is depicted by the small arrows. The cooling fluid exits from channel 20 into frusto-conical chamber 21 whereupon it impinges against the top of fluid dispensing plate 16. As the cooling fluid moves radially outward in the space between the bottom of inner section 11 and the top of plate 16, it flows through nozzles 22. Nozzles 22 are inclined at an angle through fluid dispensing plate 16 so that the cooling fluid will have a predetermined direction when it enters the cavity 15 between the bottom of plate 16 and the inside of outer section 12. The direction of the cooling fluid is not only radially directed but also is given a circumferential direction by nozzles 22. The resulting flow of the cooling fluid in the space between the bottom of dispensing plate 16 and the interior surface of the outer section of the plunger is quite turbulent thus insuring an adequate removal of the gases comprising the film boiling state of the cooling medium. An upstanding flange 23 is placed around the peripheral edge of fluid dispensing plate 16 to further direct the fluid through nozzles 22.

While certain representative embodiments and details have been shown for the purpose of illustrating the invention, it will be apparent to those skilled in this art that various changes and modifications may be made therein without departing from the spirit or scope of the invention.

What is claimed is:

1. The method of regulating the temperature of a plunger containing a cooling medium utilized in the formation of an article from a heat softened mass of material including the steps of:
   (1) Permitting an exterior section of said plunger to rise in temperature through contact with said heat softened mass of material,
   (2) Allowing the cooling medium situated internally adjacent the external section of said plunger to pass from a nucleate boiling state to a film boiling state thereby reducing markedly the heat flow from said external section to said cooling medium,
   (3) Sensing the temperature of the external section of the plunger through temperature sensing means positioned so as to detect changes in temperature of said external section and causing said means to produce a signal which transmits the temperature so sensed to a temperature regulator,
   (4) Regulating the temperature of the external section of the plunger by varying the flow of cooling medium to the plunger through said regulator,
   (5) Increasing the flow of the cooling medium through the plunger to remove the state of film boiling when the plunger exceeds the desired temperature in the external section thereof, and
   (6) Decreasing the flow of the cooling medium through the plunger when the plunger has reached the desired operating temperature.

2. The method of utilizing the film boiling state of a cooling fluid to control the heat flow from a plunger used in the formation of an article from a heat softened mass of material including the steps of:
   (1) Permitting the exterior section of said plunger to rise in temperature while the cooling fluid within said plunger is circulated at a low velocity,
   (2) Causing the cooling fluid within said plunger to pass from a nucleate boiling state to a film boiling state thereby causing the heat transfer rate to drop,
   (3) Sensing the temperature of the external section of the plunger through temperature sensing means positioned so as to detect changes in temperature of said external section and causing said means to produce a signal which transmits the temperature so sensed to a temperature regulator,
   (4) Regulating the temperature of the external section of the plunger by varying the flow of cooling fluid to the plunger through said regulator,
   (5) Increasing the flow of the cooling fluid through said plunger by means of said regulator to remove the state of film boiling and increase the heat transfer rate when the plunger temperature exceeds the desired temperature range, and
   (6) Decreasing the flow of the cooling fluid through the plunger when the plunger temperature is lowered to within the desired working range.

3. The method as set forth in claim 2, step 5, wherein the flow of the cooling fluid through the plunger is decreased to a stagnant state when the plunger temperature is lowered to within the desired working range.

4. The method as set forth in claim 2, steps 4 and 5, wherein the external temperature of the plunger is regulated within a working range of 500° F. to 1100° F. by increasing and decreasing the flow of the cooling fluid through the plunger.

5. The method as set forth in claim 2, step 1, wherein the heat flow rate from the plunger is held greater than 70,000 B.t.u./ft.$^2$ hr. when said cooling fluid is circulated at a low velocity.

6. An apparatus for forming an article from a heat deformable material by forcing a plunger into contact with a heat softened mass of said heat deformable material placed in a mold having an internal molding surface corresponding generally to the external configuration of said article which is to be formed, said plunger having an external molding surface corresponding to the internal configuration of the article which is to be formed, an internal and an external section in spaced apart relation with respect to each other, thus defining a cavity therebetween, and temperature sensing means positioned so as to detect changes in temperature of said external section and coact with a controller unit for regulating the amount of cooling fluid, the improvement wherein the internal section of said plunger contains a centrally located fluid inlet chamber that is in communication with a frusto-conical member which, in turn, permits the transfer of the cooling fluid communicatively to a fluid distribution chamber formed by a plate attached to the end of the internal section of the plunger, said plate having a raised flange positioned around the peripheral side which acts as a spacer between the surface of the plate and the end of the internal section of the plunger and having positioned therein fluid dispensing orifices downwardly and outwardly inclined so that they are askewed to the periphery of the support plate.

References Cited

UNITED STATES PATENTS

| | | | |
|---|---|---|---|
| 0,835,393 | 11/1906 | Brookfield | 65—319 |
| 2,082,662 | 6/1937 | Simpson et al. | 65—319 X |
| 2,658,687 | 11/1953 | Southworth | 65—162 X |
| 2,751,715 | 6/1956 | Denman | 65—319 X |
| 2,882,647 | 4/1959 | Tallent | 65—319 |
| 2,950,816 | 8/1960 | Arenz | 65—162 X |
| 3,203,777 | 8/1965 | Berry et al. | 65—319 X |

S. LEON BASHORE, Primary Examiner

R. V. FISHER, Assistant Examiner

U.S. Cl. X.R.

65—305, 319, 355, 362